J. T. TROWBRIDGE.
Seeder and Cultivator Combined.
No. 104,515.  Patented June 21, 1870.
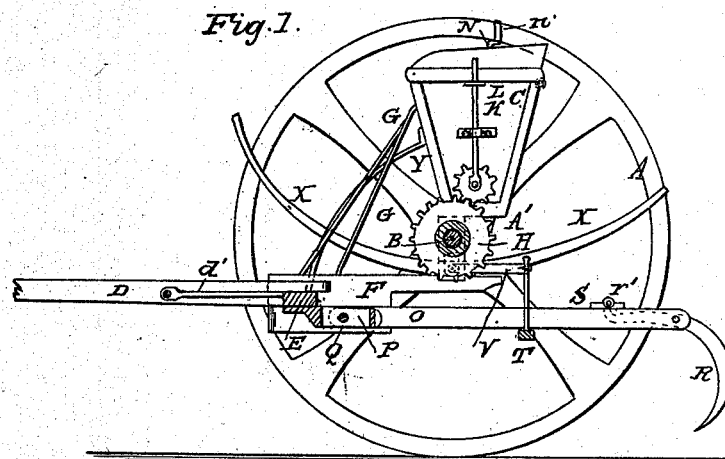
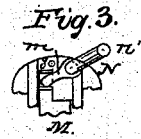
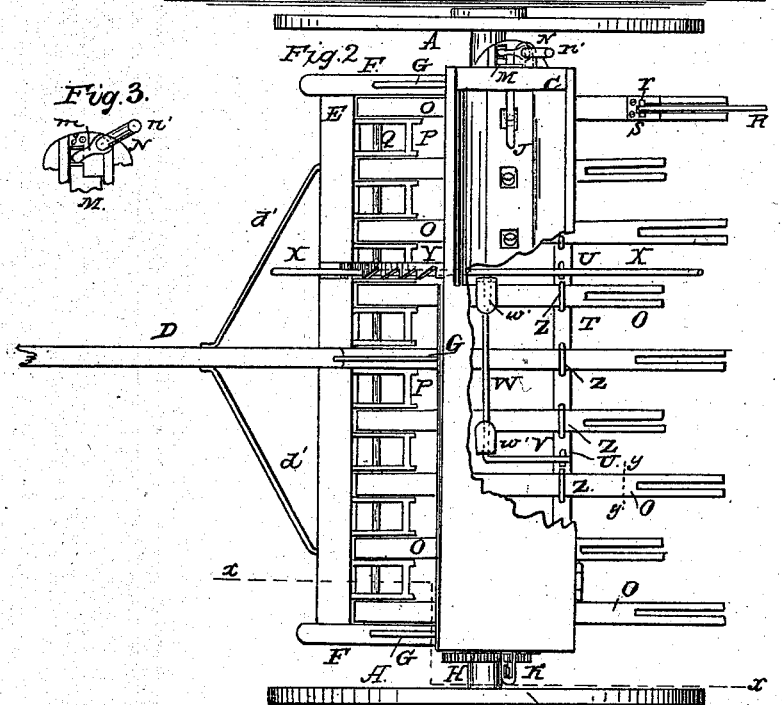
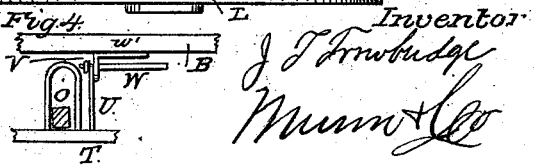

United States Patent Office.

JAMES T. TROWBRIDGE, OF AKRON, OHIO.

Letters Patent No. 104,515, dated June 21, 1870.

IMPROVEMENT IN SEEDER AND CULTIVATOR COMBINED.

The Schedule referred to in these Letters Patent and making part of the same

*To all whom it may concern:*

Be it known that I, JAMES T. TROWBRIDGE, of Akron, in the county of Summit and State of Ohio, have invented a new and useful Improvement in Seeder and Cultivator; and I do hereby declare that the following is a full, clear, and exact description thereof, which will enable others skilled in the art to make and use the same, reference being had to the accompanying drawing forming part of this specification.

Figure 1 is a detail cross-section of my improved machine, taken through the line $x\ x$, fig. 2.

Figure 2 is a top view of the same, parts being broken away to show the construction.

Figure 3 is a detail view of the dropping-slide.

Figure 4 is a detail sectional view, taken through the line $y\ y$, fig. 2.

Similar letters of reference indicate corresponding parts.

My invention has for its object to improve the construction of the seeder and cultivator known as the "Champion of Iowa," so as to make it simpler in construction, stronger, more effective in operation, and more convenient in use; and It consists in the construction and combination of the various parts of the machine, as hereinafter more fully described.

A are the wheels, which revolve upon journals formed upon or attached to the axle B.

C is the seed-box, which rests upon and is attached to the axle B.

D is the tongue, the rear end of which is attached to the cross-bar E, and which is strengthened by braces $d'$.

The ends of the cross-bar E are connected to the end parts of the axle B by the bars F.

The bars E F are further strengthened and supported by the braces G, the upper ends of which are secured to the seed-box C, as shown in figs. 1 and 2.

To the inner end of the hub of one of the wheels A is attached a gear-wheel H, into the teeth of which mesh the teeth of the small gear-wheel I, placed upon the end of the shaft J, which passes longitudinally through the seed-box C, and to which the stirrers or agitators are attached.

K is a lever, the lower end of which is connected with the gear-wheel I, and which is pivoted to a support attached to the end of the seed-box C.

The upper end of the lever K passes through a catch, L, attached to the upper part of the end of the seed-box C, so that it may be securely held both when holding the gear-wheel I in gear and out of gear with the gear-wheel H.

The seed passes out of the seed-box C through holes in its bottom, which bottom is made double, and between its parts is placed a sliding bar or plate, M, having holes made through it corresponding in size and position with the holes through the bottom of the seed-box C, so that, by adjusting the position of the said slide, the size of the discharge-openings may be regulated at will.

The slide M is moved, to open and close the discharge-openings, by the lever N, working in bearings attached to the end of the seed-box C.

Upon the upper end of the lever N is formed a crank, $n^1$, for convenience in operating it, and upon its lower end is formed, or to it is attached, an arm, $n^2$ passing between ears or projections formed upon or attached to the upper side of the end of the said slide M, so that, by operating the lever N, the said slide may be moved out and in at will.

The movement or throw of the slide M is limited by a stop-pin, placed in one or the other holes formed in the bed-plate of said slide, as shown in fig. 3, which stops the outward movement of said slide always at the same point, and thus insures the discharge-openings being always opened to exactly the same extent.

O are the plow-beams, the forward ends of which are pivoted to and between the small blocks or frames P by a long rod, Q, as shown in fig. 2.

The blocks or frames P are securely attached to the cross-bar E, to which the tongue D is attached.

The beams O are made alternately longer and shorter, as shown in fig. 2, and their rear ends are slotted, to receive the plow or cultivator-teeth R.

The plows R are pivoted in the slotted ends of the beams O, and their upper ends are extended forward, and their extreme forward ends are turned upward, and have holes formed through them to receive a cross-pin, $r'$, as shown in figs. 1 and 2.

S are small slotted plates, attached to the upper sides of the beams O, at the inner ends of the slots of said beams.

The upper sides of the plates S are recessed, to receive the cross-pins $r'$ of the forward upper ends of the plows R.

The cross-pins in the ends of the plows R should be made large enough to resist the strain in ordinary plowing, but should the points of the plows strike an obstruction, the said cross-pins will be shaved off, allowing the upper ends of said plows to pass down through the slots in the beams O, thus guarding against breakage.

T is a cross-bar, extending across beneath the beams O, and to which are attached the lower ends of the standards U, one of which is pivoted to the end of the crank-arm V, formed upon or attached to the end of the rod W, which works in bearings $w'$, attached to the under side of the axle B.

The upper end of the other standard U is pivoted to the lever X, which is rigidly attached to the other end of the rod W.

The rear end of the lever X extends back into such a position that its said rear end may be reached and operated by the driver walking in the rear of the machine. The other end of the lever X extends forward and upward into such a position that it may conveniently be reached and operated by the driver from his seat.

Y is a curved ratchet-bar, the lower end of which is secured to the cross-bar E, and the upper end of which is secured to the seed-box C.

The ratchet-bar Y is so placed that the forward part of the lever X may catch upon its teeth, to secure it into any position in which it may be adjusted.

To the cross-bar T are attached loops or bows Z, through which the plow-beams O pass, as shown in figs. 1, 2, and 4.

By this construction the plows may be forced into the ground to any desired depth, or adjusted to work at any desired depth, or raised entirely from the ground, as may be desired.

A' are buttons or small plates, pivoted to the under side of the bottom of the seed-box C, in such positions that they may be turned forward to cover or close the discharge-openings through the said bottom of the said seed-box C, so that the escape of the seed through any desired number of said openings may be prevented at will, each button or plate being independent of all the others.

Having thus described my invention,

I claim as new and desire to secure by Letters Patent—

1. The combination of the lever X, ratchet-bar Y, rod W, arm V, and standard U, with the cross-bar T, seed-box C, axle B, cross-bar E, and pivoted plow-beams O, substantially as herein shown and described, and for the purpose set forth.

2. The loops Z, in combination with the plow-beams O, cross-bar T, standard U, arm V, rod W, and lever X, substantially as herein shown and described, and for the purpose set forth.

3. The combination of the recessed and slotted blocks or plates S and cross-pins r' with the slotted rear parts of the plow-beams O, and with the extended upper ends of the cultivator-teeth or plows R, substantially as herein shown and described, and for the purpose set forth.

JAMES T. TROWBRIDGE.

Witnesses:
E. P. GREEN,
J. W. MOORE.